US012705539B2

(12) United States Patent
Nayak et al.

(10) Patent No.: US 12,705,539 B2
(45) Date of Patent: Aug. 11, 2026

(54) USER INTERFACES AND RULE DISCOVERY AND AUTOMATION

(71) Applicant: RAKUTEN SYMPHONY, INC., Tokyo (JP)

(72) Inventors: Sandeep Kumar Nayak, Tokyo (JP); Raja Jain, Tokyo (JP)

(73) Assignees: RAKUTEN MOBILE, INC., Tokyo (JP); RAKUTEN SYMPHONY, INC., Tokyo (JP)

( * ) Notice: Subject to any disclaimer, the term of this patent is extended or adjusted under 35 U.S.C. 154(b) by 723 days.

(21) Appl. No.: 18/306,181

(22) Filed: Apr. 24, 2023

(65) Prior Publication Data

US 2024/0354639 A1 Oct. 24, 2024

(51) Int. Cl.

| | |
|---|---|
| ***G06N 20/00*** | (2019.01) |
| ***G06F 16/23*** | (2019.01) |
| ***G06F 16/248*** | (2019.01) |
| ***G06F 16/28*** | (2019.01) |
| ***G06F 16/3349*** | (2025.01) |
| ***G06F 16/9535*** | (2019.01) |
| ***G06F 16/9538*** | (2019.01) |
| ***G06Q 10/0639*** | (2023.01) |

(52) U.S. Cl.

CPC ......... *G06N 20/00* (2019.01); *G06F 16/2379* (2019.01); *G06F 16/248* (2019.01); *G06F 16/285* (2019.01); *G06F 16/3349* (2019.01); *G06F 16/9535* (2019.01); *G06F 16/9538* (2019.01); *G06Q 10/06393* (2013.01)

(58) Field of Classification Search

CPC ............... G06F 16/2379; G06F 16/285; G06F 16/9035; G06F 16/904; G06F 16/9535; G06F 16/986; G06N 20/00; G06Q 10/6393

USPC .......................................................... 707/737

See application file for complete search history.

(56) References Cited

U.S. PATENT DOCUMENTS

| | | | | |
|---|---|---|---|---|
| 7,216,292 | B1 * | 5/2007 | Snapper | G06F 40/174 715/236 |
| 8,768,921 | B2 * | 7/2014 | Ghosal | G06F 16/3349 707/731 |
| 10,198,698 | B2 * | 2/2019 | Jayaraman | G06F 40/174 |
| 11,494,551 | B1 * | 11/2022 | Espinas | G06N 20/00 |
| 12,124,793 | B2 * | 10/2024 | Jain | G06F 40/20 |

(Continued)

*Primary Examiner* — Shahid A Alam

(74) *Attorney, Agent, or Firm* — HAUPTMAN HAM, LLP

(57) ABSTRACT

A system includes a medium configured to store instructions thereon; and a processor. The processor is configured to execute the instructions for instructing a display to display a first rule definition GUI displaying first attributes associated with a first rule, receiving a first multi-source dataset, training a machine learning tool using the first multi-source dataset, wherein the first set of attributes associated with the rule is used as input features for the machine learning model, dividing the first multi-source dataset into a set of clusters using a first unsupervised clustering technique, wherein the set of clusters includes: a first cluster; and a second cluster, determining second attributes associated with a second rule based on the set of clusters, determining a similarity of the first attributes of the first rule and the second attributes of the second rule, delivering, in response to the similarity exceeding a first threshold, a first recommendation.

20 Claims, 8 Drawing Sheets

(56) References Cited

U.S. PATENT DOCUMENTS

| | | | | |
|---|---|---|---|---|
| 2010/0306249 | A1* | 12/2010 | Hill | G06F 16/9535 707/769 |
| 2016/0275062 | A1* | 9/2016 | Xu | G06F 3/0484 |
| 2020/0250715 | A1* | 8/2020 | Mustafi | G06F 18/24 |
| 2022/0318236 | A1* | 10/2022 | Smith | G06F 16/248 |
| 2022/0327583 | A1* | 10/2022 | Fotso | G06N 20/00 |
| 2023/0098882 | A1* | 3/2023 | Sinn | G06F 16/9538 707/732 |
| 2023/0206610 | A1* | 6/2023 | Pyzow | G06V 10/776 382/157 |

* cited by examiner

700

| Data Point | Similar Score |
|---|---|
| B | 0.9 |
| E | 0.86 |
| D | 0.84 |
| H | 0.7 |
| L | 0.5 |
| V | 0.48 |

702

USER INTERFACES AND RULE DISCOVERY AND AUTOMATION

TECHNICAL FIELD

This description relates to graphical user interfaces and rule discovery and automation.

BACKGROUND

Approval management involves workflows or processes for having documents, tickets, orders, or invoices accepted by an authorizing individual, unit, or organization. Actions within organizations needing oversight are often subject to approvals, and in turn, benefit from efficient approval management.

SUMMARY

A system includes a non-transitory computer readable medium configured to store instructions thereon. The system further includes a processor connected to the non-transitory computer readable medium, wherein the processor is configured to execute the instructions for instructing a display to display a first rule definition graphical user interface (GUI) displaying first attributes associated with a first rule. The processor is configured to execute the instructions for receiving a first multi-source dataset, wherein the first multi-source dataset comprises the first set of attributes associated with the first rule and a first set of requests comprising a first set of characteristics. The processor is configured to execute the instructions for training a machine learning tool using the first multi-source dataset, wherein the first set of attributes associated with the rule is used as input features for the machine learning model. The processor is configured to execute the instructions for dividing the first multi-source dataset into a set of clusters using a first unsupervised clustering technique, wherein the set of clusters comprises: a first cluster and a second cluster. The processor is configured to execute the instructions for determining second attributes associated with a second rule based on the set of clusters. The processor is configured to execute the instructions for determining a similarity of the first attributes of the first rule and the second attributes of the second rule. The processor is configured to execute the instructions for delivering, in response to the similarity exceeding a first threshold, a first recommendation, wherein the delivering the first recommendation comprises instructing the display to display a second rule definition graphical user interface (GUI) displaying the second attributes associated with the second rule. The processor is configured to execute the instructions for receiving an indication to approve or commit the second rule.

A method includes instructing a display to display a first rule definition graphical user interface (GUI) displaying first attributes associated with a first rule. The method further includes receiving a first multi-source dataset, wherein the first multi-source dataset comprises the first set of attributes associated with the first rule. The method further includes a first set of requests comprising a first set of characteristics. The method further includes training a machine learning tool using the first multi-source dataset, wherein the first set of attributes associated with the rule is used as input features for the machine learning model. The method further includes dividing the first multi-source dataset into a set of clusters using a first unsupervised clustering technique, wherein the set of clusters comprises a first cluster and a second cluster. The method further includes determining second attributes associated with a second rule based on the set of clusters. The method further includes determining a similarity of the first attributes of the first rule and the second attributes of the second rule. The method further includes delivering, in response to the similarity exceeding a first threshold, a first recommendation, wherein the delivering the first recommendation comprises instructing the display to display a second rule definition graphical user interface (GUI) displaying the second attributes associated with the second rule. The method further includes receiving an indication to approve or commit the second rule.

A non-transitory computer readable medium configured to store instructions thereon. The instructions are configured to cause a processor to perform operations comprising instructing a display to display a first rule definition graphical user interface (GUI) displaying first attributes associated with a first rule. The instructions are configured to cause a processor to perform operations comprising receiving a first multi-source dataset, wherein the first multi-source dataset comprises the first set of attributes associated with the first rule and a first set of requests comprising a first set of characteristics. The instructions are configured to cause a processor to perform operations comprising training a machine learning tool using the first multi-source dataset, wherein the first set of attributes associated with the rule is used as input features for the machine learning model. The instructions are configured to cause a processor to perform operations comprising dividing the first multi-source dataset into a set of clusters using a first unsupervised clustering technique, wherein the set of clusters comprises a first cluster a second cluster. The instructions are configured to cause a processor to perform operations comprising determining second attributes associated with a second rule based on the set of clusters. The instructions are configured to cause a processor to perform operations comprising determining a similarity of the first attributes of the first rule and the second attributes of the second rule. The instructions are configured to cause a processor to perform operations comprising delivering, in response to the similarity exceeding a first threshold, a first recommendation, wherein the delivering the first recommendation comprises instructing the display to display a second rule definition graphical user interface (GUI) displaying the second attributes associated with the second rule. The instructions are configured to cause a processor to perform operations comprising receiving an indication to approve or commit the second rule.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
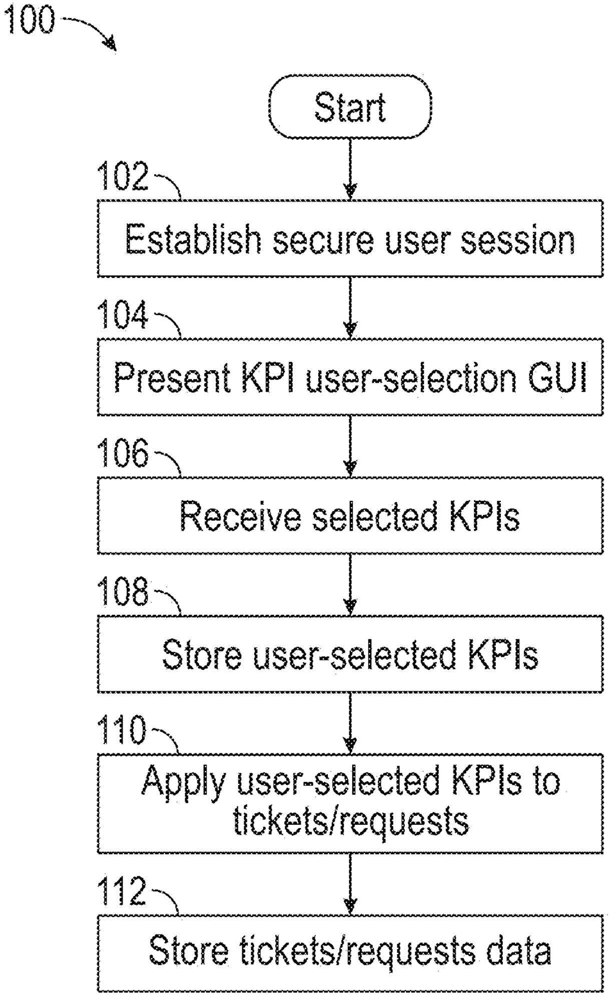
FIG. 1 is a flowchart of a process of using a graphical user interface (GUI) to enter user-defined key performance indicators (KPIs), according to some embodiments of the subject disclosure.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals or letters in the various examples. This repetition is for the purpose of simplicity and clarity and does not in itself dictate a relationship between the various embodiments or configurations discussed.

Approval management processes include cumbersome, time-consuming, and resource-draining tasks because these tasks include repetitive actions or actions that only slightly duffer, yet separately are subject to approvals. Organizations and departments frequently discover and encounter this issue, especially during growth of the business or organization.

Inability or lack of systems to handle approval management, and especially in an environment of scaling approval needs, causes many problems. In some examples:

Deadlines are missed or jeopardized when an approval backup or logjam occurs.

Approval personnel or staff often spend or waste time handling approval-related processes or attempting to determine the status of an approval. In some cases, personnel become lost or confused trying to determine the steps of an approval process or when approvals are needed for various requests, which results in mistaken approvals.

In some cases, the complexity of the intersection of an organization's approval process and training or learning required from personnel or staff becomes very large. This creates complexity in determining or provided an audit trail for approvals.

The current description provides a system which allows for more efficient and streamlined handling of approval management. For example, the current description includes graphical user interface (GUI) configurations or methods for automating rule approvals, rule creation, and other approval assistance processes. The current description includes processes for determining rule preferences or profiles associated with users such as rule approvers. Further, the current description includes clustering methods and models that incorporate user feedback to continuously recalibrate the models. In some examples, similarity determinations between existing rules and recommended rules. In some examples, similarity thresholds are used to recommend rules to users. As a result, the current description allows recommendations for rules that meet user preferences and continuously incorporate user feedback.

Figure 4:
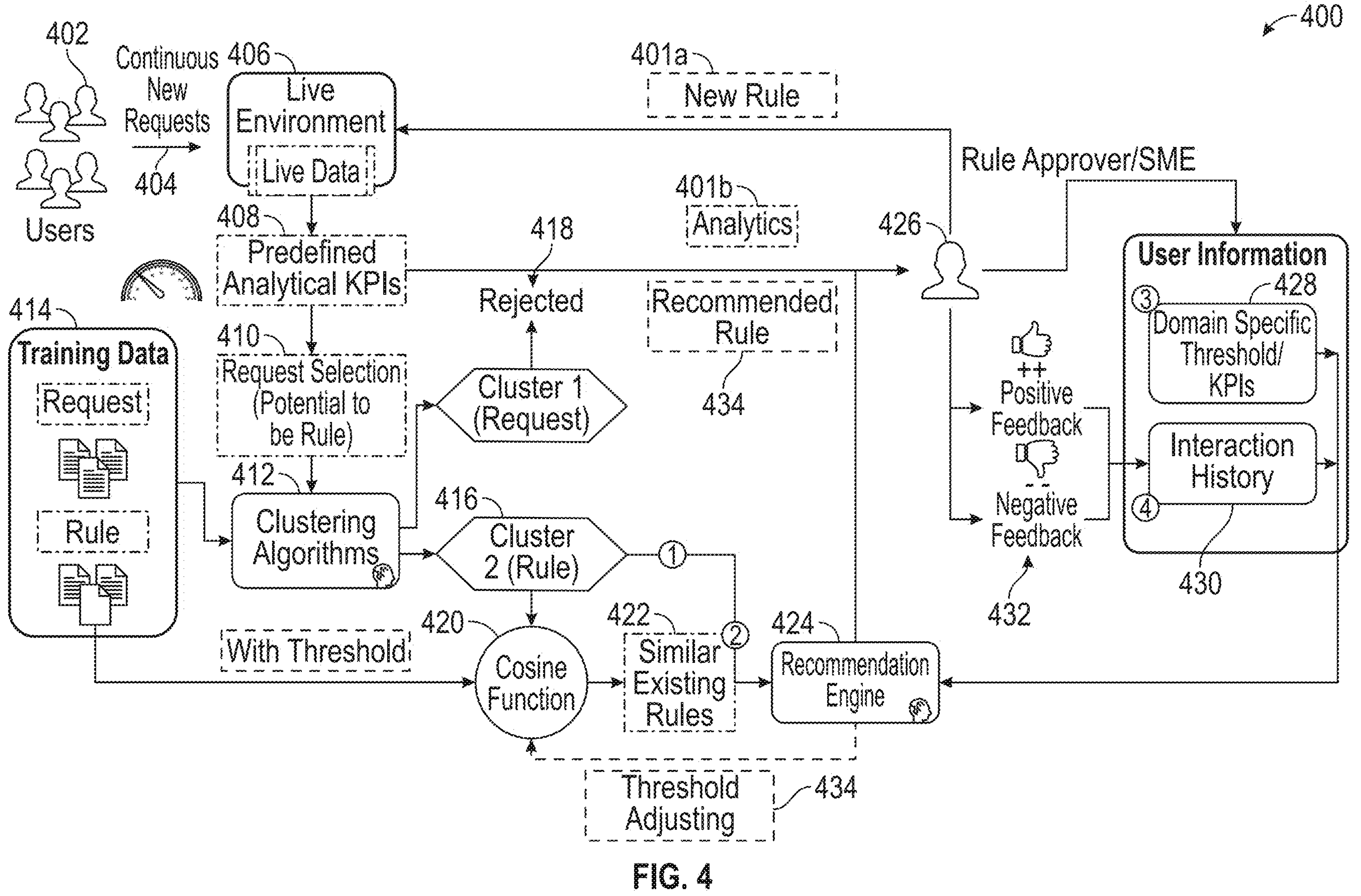
FIG. 4 is a block diagram of an approval rule discovery system, according to some embodiments of the subject disclosure.

FIG. 1 is a flowchart of a process 100 of using a graphical user interface (GUI) to enter user-defined key performance indicators (KPIs), according to some embodiments of the subject disclosure. The process 100 is usable by a user, such as a rule approver, to enter preferences or preference data associated with one or more rules. In some embodiments, the process 100 is able to be executed by the system 400 (FIG. 4). In some embodiments, the process 100 is able to be executed by a system other than the system 400 (FIG. 4).

In operation 102, a user, such as a supervisor, director, rule approver or department head, is authenticated or logs into to a user account. In some embodiments, a secure user session is established using Transport Layer Security/Secure Socket Layer (TLS/SSL) encryption, for example. In some embodiments, authentication includes use of a username or password for login. In some embodiments, an encrypted version of a password is stored. In some embodiments, authentication includes use of one or more biometric identifiers to verify a user identity. In some embodiments, one or more biometric identifiers are stored.

Figure 2:
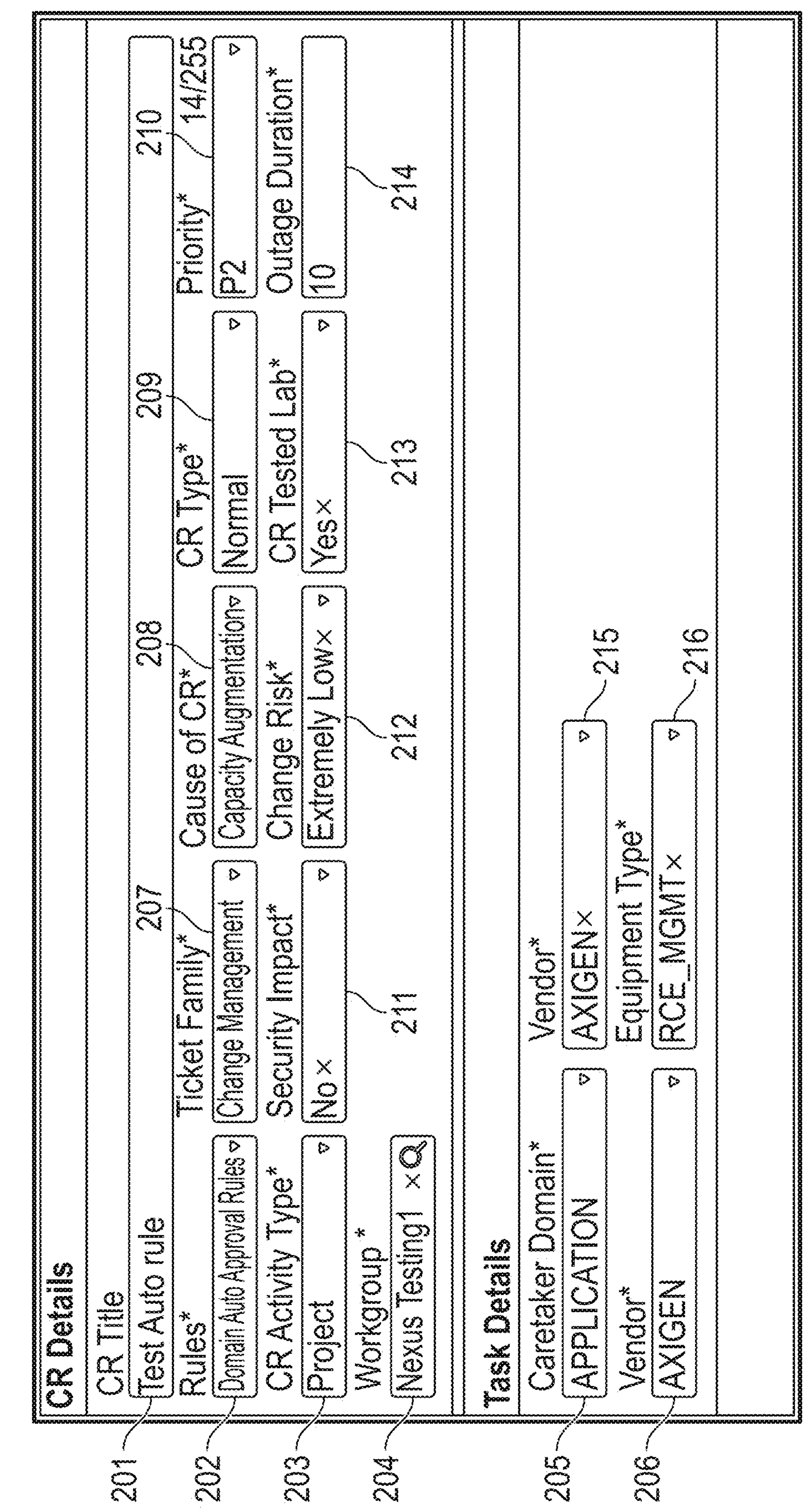
FIG. 2 is diagram of a graphical user interface (GUI) for entering user-defined key performance indicators (KPIs), according to some embodiments of the subject disclosure.

In operation 104, the user is presented with a first graphical user interface (GUI) associated with an account. The first GUI displays various fields or selectable options associated with approval rules. For example, selectable dropdown menus are displayed for various approval rule attributes, such as a rule name or relevant key performance indicators (KPIs). The KPIs are associated with the user, user account, user role, etc. In some embodiments, the operation 104 is able to be executed by a system using GUI 200 (FIG. 2). In some embodiments, the operation 104 is able to be executed by a system other than a system using GUI 200 (FIG. 2).

In operation 106, user selections using the various selectable options are received. In some embodiments, user selections are received from a web form. In some embodiments, web form selections are posted to a backend system in a Hypertext Transfer Protocol/Secure (HTTP/HTTPS) request, for example. In some embodiments, a user selects options using a dropdown menu. In some embodiments, a user selects options using an entry field. In some embodiments, a user selects options using a radio button. In some embodiments, a user enters information or selects options using a keyboard, touchscreen, mouse, by voice recognition, etc.

In operation 108, user selections, configurations, or associated data are stored. For example, after a user selects various attributes or enters a rule name, a rule configuration reflecting the combination of attributes are stored in association with the rule name or a unique identifier. In some embodiments, the aforementioned data elements are stored in one or more datastores or databases.

In operation 110, the rule configuration is applied to incoming tickets or requests. In some embodiments, a ticket is a request made by a client or user to obtain an approval of a department. In some embodiments, a ticket is a request made by a client or user to obtain a service offered by a department. In some embodiments, a rule is a set of criteria, parameters, attributes, or properties. For example, each of one or more elements associated with incoming tickets or requests is compared with each of the rule configuration attributes or rule criteria. A determination is made regarding whether the incoming tickets or requests meet the rule configuration attributes or rule criteria. In some examples, rule configuration attributes or rule criteria are selections or preferences for a rule selected by a user. In some embodiments, incoming tickets or requests that meet the rule configuration attributes or rule criteria are auto-approved when the rule meets auto-approval rule criteria pre-defined by a user.

In operation 112, data associated with the incoming tickets or requests are stored. For example, in some embodiments, attributes associated with the tickets or requests are stored. In some embodiments, whether the rule configuration was used to accept or reject an approval for the ticket or request are stored.

One of ordinary skill in the art would understand that additional operations are possible within process 100 in some embodiments. For example, in some embodiments, the process 100 further includes additional user KPI selections. In some embodiments, an order of operations of the process 100 is changed. For example, in some embodiments the operation 110 is performed prior to the operation 108. In some embodiments, at least one operation of the process 100 is omitted. For example, in some embodiments, the operation 108 is omitted.

Utilizing the process 100 helps to ensure that user feedback is incorporated. As a result, approval management processes described herein are more likely to meet user preferences.

FIG. 2 is diagram of a graphical user interface (GUI) 200 for receiving user-defined key performance indicators (KPIs), according to some embodiments of the subject disclosure. The GUI 200 is associated with a user account. The GUI 200 displays various fields or selectable options associated with approval rules. For example, entry field 201 and various selectable dropdown menus 202-216 are displayed corresponding to various approval rule attributes, such as a rule name in entry field 201 or relevant key performance indicators (KPIs) in selectable dropdown menus 202-216. The KPIs 202-216 are associated with the user, user account, user role, etc. For example, KPIs selected by a user are stored in a database or datastore in association with a user account or user ID. In 200, fields or selectable dropdowns are shown for a title 201, rules 202, activity type 203, workgroup 204, caretaker domain 205, vendor 206, ticket family 207, cause 208, type 209, priority 210, security type 211, change risk 212, tested lab 213, outage duration 214, vendor 215, and equipment type 216 are shown.

Figure 3:
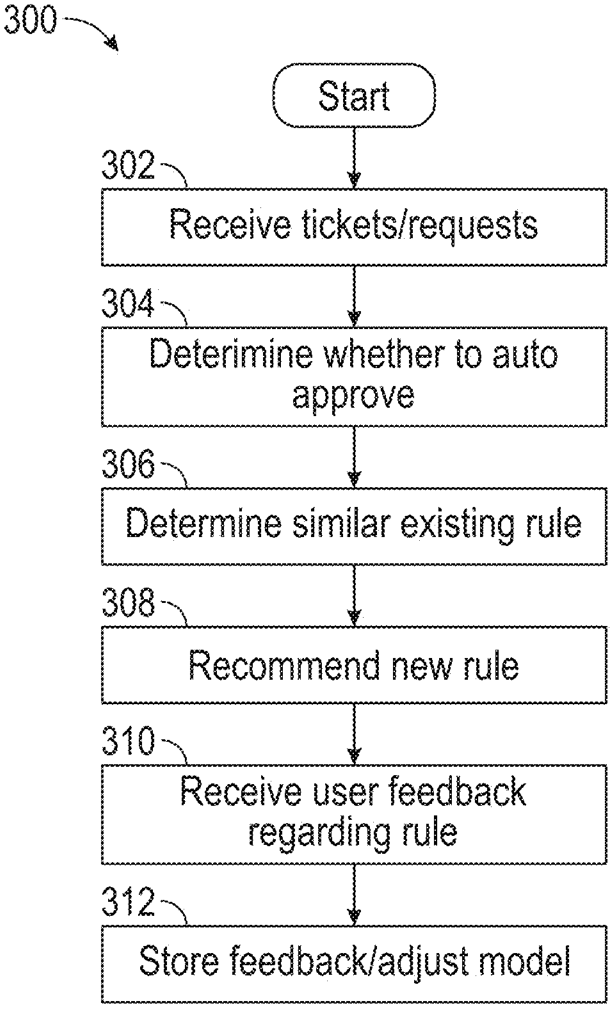
FIG. 3 is a flowchart of an approval rule discovery process, according to some embodiments of the subject disclosure.

FIG. 3 is a flowchart of an approval rule discovery process 300, according to some embodiments of the subject disclosure. In some embodiments, the process 300 is able to be executed by the system 400 (FIG. 4). In some embodiments, the process 300 is able to be executed by a system other than the system 400 (FIG. 4).

In operation 302, a system receives a ticket or request. For example, tickets or requests are service tickets awaiting approval from an approver, user, such as a supervisor, director, or department head. Pre-configured rules based on KPIs to be auto-approved are stored according to the approver's preferences. For example, a database storing pre-configured auto-approval rule attributes, parameters, or settings are stored, along with a rule name, in association with a unique identifier associated with the approver.

In operation 304, a determination is made regarding whether the ticket or request is covered by the auto-approval rule configuration. If the ticket or request meets the KPI criteria pre-configured by the approver, the ticket or request is automatically approved. If the ticket or request is not covered by the configuration criteria, the ticket or request is not automatically approved.

In operation 306, a determination is made whether an auto-approval rule configuration is stored in association with the approver that is similar to a rule configuration that includes or covers the ticket or request. In some embodiments, a similarity measurement, metric, or parameter is determined. In some embodiments, a similarity determination is made by comparing a similarity of attributes of existing rules associated with a particular user and a potential recommended rule. In some embodiments, a cosine similarity is determined between the attributes of existing rules associated with the particular user and the potential recommended rule. In some embodiments, a similarity threshold is pre-defined that is used to determine whether a potential recommended rule is recommended to a user. In some embodiments, a similarity threshold is pre-defined within range that is used to determine whether a potential recommended rule is recommended to a user. In some embodiments, a similarity threshold is a pre-defined value that is used to determine whether a potential recommended rule is recommended to a user. In some examples, a pre-defined threshold for a cosine similarity between the attributes of existing rules associated with the particular user and the potential recommended rule is pre-defined within a range between 0.5 and 0.7. In some examples, a predefined threshold for a cosine similarity between the attributes of existing rules associated with the particular user and the potential recommended rule is pre-defined as 0.6. If a predefined threshold is too low, then a risk of auto-approving a rule configuration that should not be approved increases, in some instances.

Figure 8:
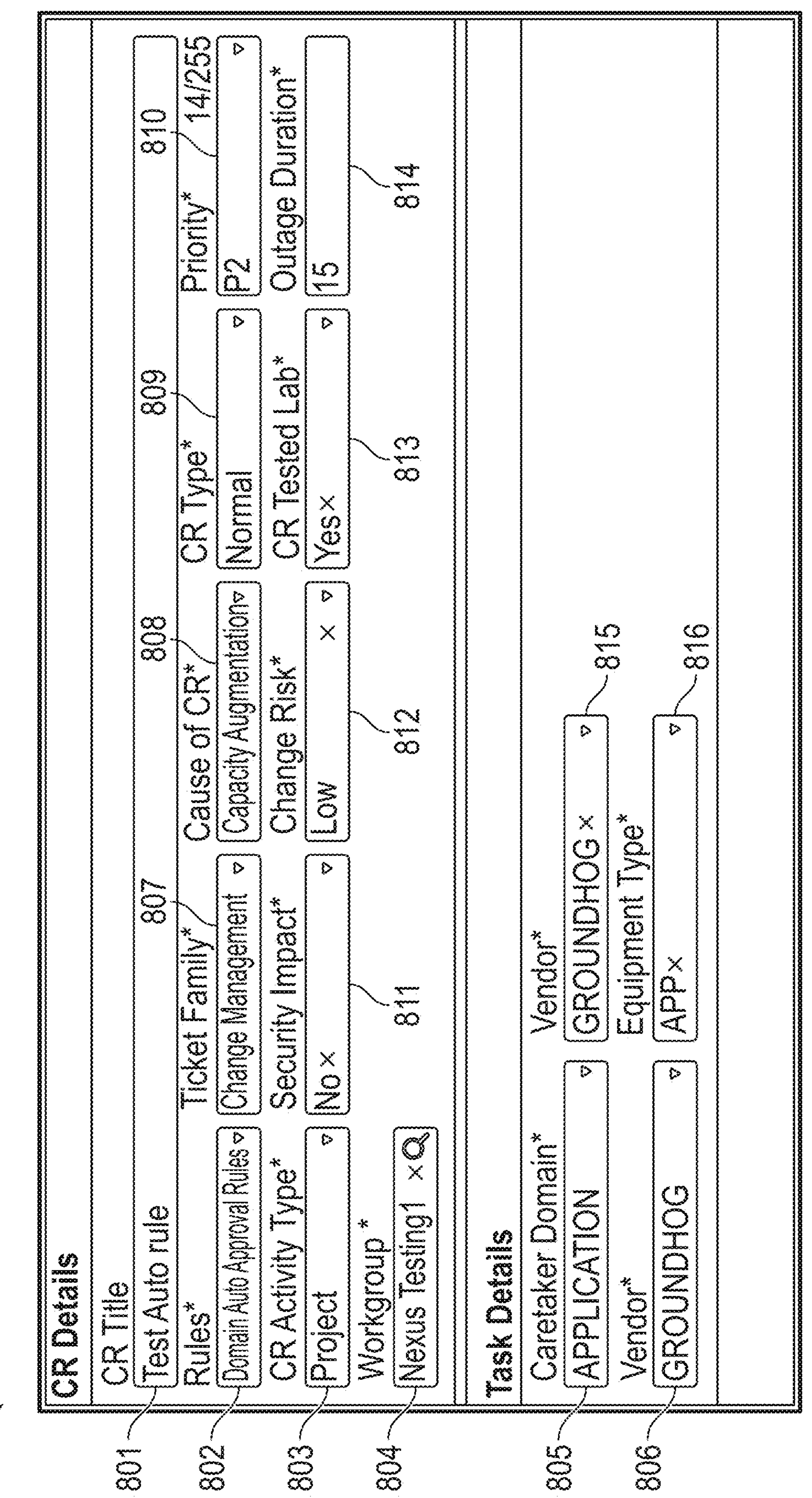
FIG. 8 is diagram of a graphical user interface (GUI) for using an adjusted rule, according to some embodiments of the subject disclosure.

In operation 308, based on whether the measurement, metric, or parameter meets or exceeds a pre-defined threshold, a rule recommendation is made. If the measurement, metric, or parameter does not meet or exceed the pre-defined threshold a rule recommendation is not made. In some embodiments, a rule recommendation is made by displaying a GUI with pre-selected attributes for fields corresponding to fields for defining a rule configuration as described by embodiments herein. In some embodiments, pre-selected attributes which differ from attributes of a corresponding auto-approval rule or existing rule are highlighted. In some embodiments, pre-selected attributes which differ from attributes of a corresponding auto-approval rule or existing rule are distinguished using bolding. In some embodiments, pre-selected attributes which differ from attributes of a corresponding auto-approval rule or existing rule are distinguished using italics. In some embodiments, pre-selected attributes which differ from attributes of a corresponding auto-approval rule or existing rule are distinguished using a different font color. In some embodiments, the operation 308 is able to be executed by a system using GUI 800 (FIG. 8). In some embodiments, the operation 308 is able to be executed by a system other than a system using GUI 800 (FIG. 8).

In operation 310, the approver provides feedback based on whether the rule recommendation is desirable, preferable, accurate, or useful. The feedback is received by the system. In some embodiments, the approver feedback is received via a GUI.

In operation 312, the approver feedback is stored or used to adjust a machine learning model. In some embodiments, the approver feedback is stored in one or more databases or data stores. In some embodiments, the model continuously incorporates feedback or is retrained, which allows for continuously calibrating rule recommendations and an existing rule set.

One of ordinary skill in the art would understand that additional operations are possible within process 300 in some embodiments. For example, in some embodiments, the process 300 further includes additional user feedback operations. In some embodiments, an order of operations of the process 300 is changed. For example, in some embodiments the operation 310 is performed prior to the operation 308. In some embodiments, at least one operation of the process 300 is omitted. For example, in some embodiments, the operation 310 is omitted.

Utilizing the process 300 helps to ensure that user feedback is incorporated. As a result, approval management processes described herein are more likely to meet user preferences.

FIG. 4 is a block diagram of an approval rule discovery system 400, according to some embodiments of the subject disclosure. In some embodiments, the approval rule discovery system 400 is able to perform the process 100 (FIG. 1) or the process 300 (FIG. 3). In some embodiments, the approval rule discovery system 400 is able to perform processes other than the process 100 (FIG. 1) or the process 300 (FIG. 3).

Approval rule discovery system 400 is configured to manage requests from users 402 and rules for approving requests by another user 426 in live environment 406. In some embodiments, user 426 is a supervisor, director, rule approver or department head. Approval rule discovery system 400 is configured to authenticate or allow user 426 to log in to a user account. In some embodiments, a secure user session is established using Transport Layer Security/Secure Socket Layer (TLS/SSL) encryption, for example.

The user 426 is presented with a first graphical user interface (GUI) associated with the user's 426 account. The first GUI includes various fields or selectable options associated with approval rules. For example, selectable drop-down menus are displayed for various approval rule attributes, such as a rule name or relevant key performance indicators (KPIs) for a new rule 401*a*. The KPIs are associated with the user, user account, user role, etc. The user 426 selections from the various selectable options are received. User 426 selections, configurations, or associated data are stored as predefined KPIs 408. After the user 426 selects various attributes or enters a rule name, a rule configuration comprising predefined KPIs 408 reflecting the combination of attributes/KPIs is stored in association with the rule name or a unique identifier on which analytics 401*b* are performed. In some embodiments, predefined KPIs 408 are stored in one or more database or data stores.

The predefined KPIs 408 are compared with or applied to each incoming ticket or request 404 from users 402 requesting ticket or request review or approval. In some embodiments, comparing predefined KPIs 408 with an incoming request comprises determining whether the request meets the criteria defined by the predefined KPIs 408. In some embodiments, comparing predefined KPIs 408 with an incoming request comprises determining a number or frequency of identical or similar requests. In some embodiments, comparing predefined KPIs 408 with an incoming request comprises determining whether the request meets the criteria defined by the predefined KPIs 408. In some embodiments, comparing predefined KPIs 408 with an incoming request comprises determining whether the request meets the criteria defined by the attributes of the predefined KPIs 408. In some embodiments, comparing predefined KPIs 408 with an incoming request comprises determining whether the request nearly meets the criteria defined by the attributes of the predefined KPIs 408.

Data associated with request 404 is stored for use in, or as, training data 414. For example, incoming tickets or requests are stored, and whether a rule configuration was used to accept or reject an approval for a ticket or request is stored. In some embodiments, incoming tickets or requests are stored in one or more databases or data stores. In some embodiments, existing rules are stored in one or more databases or data stores. In some embodiments, whether incoming tickets or requests were approved or rejected based on existing rules is stored in one or more databases or data stores. In some embodiments, a frequency of identical incoming tickets or requests are stored in one or more databases or data stores. In some embodiments, a frequency of similar incoming tickets or requests are stored in one or more databases or data stores.

A determination is made whether the request 404 meets criteria, or is covered by, an auto-approval rule configuration. In some embodiments, if a ticket or request meets a rule configuration or criteria pre-configured by a user or approver, the ticket or request is automatically approved. In some embodiments, if a ticket or request does not meet a rule configuration or criteria pre-configured by a user or approver, the ticket or request is not automatically approved.

Approval rule discovery system 400 is configured to determine, in operation 410, whether or not request 404 has the potential to be recommended, introduced, or entered as a new rule or rule configuration. A determination is made whether an auto-approval rule's attributes or configuration is stored that is similar to a rule configuration that includes or covers the request 404. In other words, a rule configuration or rule profile that matches or includes attributes of the request 404 is assessed as a candidate to be a potential new configuration for a recommended rule, or to be added to an auto-approval rule set or subset. In some embodiments, auto-approval rules are stored in associated with a particular user. In some embodiments, auto-approval rules are stored in associated with a particular organization. In some embodiments, auto-approval rules are not associated with a particular user or organization. In some embodiments, a request that meets or exceeds a particular frequency is selected as a potential new rule or rule configuration. For example, in some embodiments, attributes or parameters characterizing a frequent request are determined. In some embodiments, attributes or parameters are selected that are similar to attributes or parameters of pre-defined KPIs associated with an existing rule as described herein. For example, in some embodiments, a ticket or request that meets most of the attributes or criteria of an existing auto-approval rule set by a user or differs slightly from the auto-approval rule is selected to be a potential rule. For example, in some embodiments, a ticket or request that meets most of the criteria of an existing rule except for one criterion that deviates from the existing rule's criteria slightly is selected to be a potential rule.

Approval rule discovery system 400 is configured to carry out, in operation 412, a clustering method using training data 414 to categorize, assess, or classify a rule configuration selected in operation 410. In some embodiments, data or datasets including attributes, properties, parameters, metrics, KPIs, or configurations of rules as described herein are used as input feature for one or more machine learning (ML) models. In some embodiments, training data comprises rules that are defined and data from tickets or requests (including both requests that meet auto approval configurations and those that do not).

Approval rule discovery system 400 is configured to, based on rule selected in operation 412, classify the selected rule in a first cluster 416 in response to a determination that the selected rule is accepted as a potential new rule or potential recommended rule. For example, in some embodiments, a user selects an option or provides an indication of acceptance of a recommended rule. Approval rule discovery system 400 is configured to, based on rule selected in operation 412, classify the selected rule in a second cluster 418 if it is determined that the selected rule is rejected as a potential new rule or potential recommended rule. For example, in some embodiments, a user selects an option or provides an indication of rejection of a recommended rule. In some embodiments, an unsupervised clustering model is created or used using some or all of such a dataset or data combination, which divides the dataset into one or more clusters or groups. In some embodiments, one group is for rules and one group is for requests. In some embodiments, this model determines, through its attributes, the specific group in which to classify data. In some embodiments, if data for a potential rule configuration including attributes of a request is classified into a rules group or potential rules group, there is a high probability that the attributes of that request will be converted into new rule by a user. In some embodiments, if data for a potential rule configuration including attributes of a request is classified into a rejected group, there is a low probability that the attributes of that request will be converted into new rule by a user.

Approval rule discovery system 400 is configured to determine or calculate a similarity between potential rules and one or more existing rules, in operation 420. In some embodiments, a similarity measurement, metric, or parameter is determined. In some embodiments, a similarity measurement is made by calculating a cosine similarity. In some embodiments, existing rules that have very high similarity are determined by calculating the cosine distance using cosine function or a cosine similarity. In some embodiments, based on whether the measurement, metric, or parameter meets or exceeds a pre-defined threshold, a rule recommendation is made. If the measurement, metric, or parameter does not meet or exceed the pre-defined threshold a rule recommendation is not made.

Approval rule discovery system 400 includes a recommendation engine 424. Recommendation engine 424 is configured to provide a recommended rule 434 to user 426. In some embodiments, recommended rule 434 is determined based on similarity determinations as described herein. In some embodiments, an alert is delivered to user 426 regarding the recommended rule 434. In some embodiments, an includes an email, text, notification, or reminder that a recommended rule has been created or is available.

Approval rule discovery system 400 is configured to receive feedback from user 426, in operation 432. The user 426 provides feedback based on whether a rule recommendation is desirable, preferable, accurate, or useful. In some embodiments, the model continuously incorporates feedback, which is used to continuously calibrate rule recommendations or train a machine learning model according to embodiments herein.

Approval rule discovery system 400 is configured to store feedback from user 426. The user's 426 interaction history 430 is stored or usable to adjust a machine learning model by the recommendation engine 424. In some embodiments, the model continuously incorporates feedback, which is used to continuously calibrate rule recommendations.

Approval rule discovery system 400 is configured to store KPIs selected or entered by user 426. KPIs 428 are stored or used to adjust a machine learning model by the recommendation engine 424. In some embodiments, the model continuously incorporates domain specific thresholds or KPIs, which are used to continuously calibrate rule recommendations.

Approval rule discovery system 400 is configured to adjust a threshold, in operation 434. In some embodiments, the model continuously uses incorporated feedback and KPIs, etc., to continuously calibrate thresholds that are used for rule recommendations or train a machine learning model according to embodiments herein.

Figure 5:
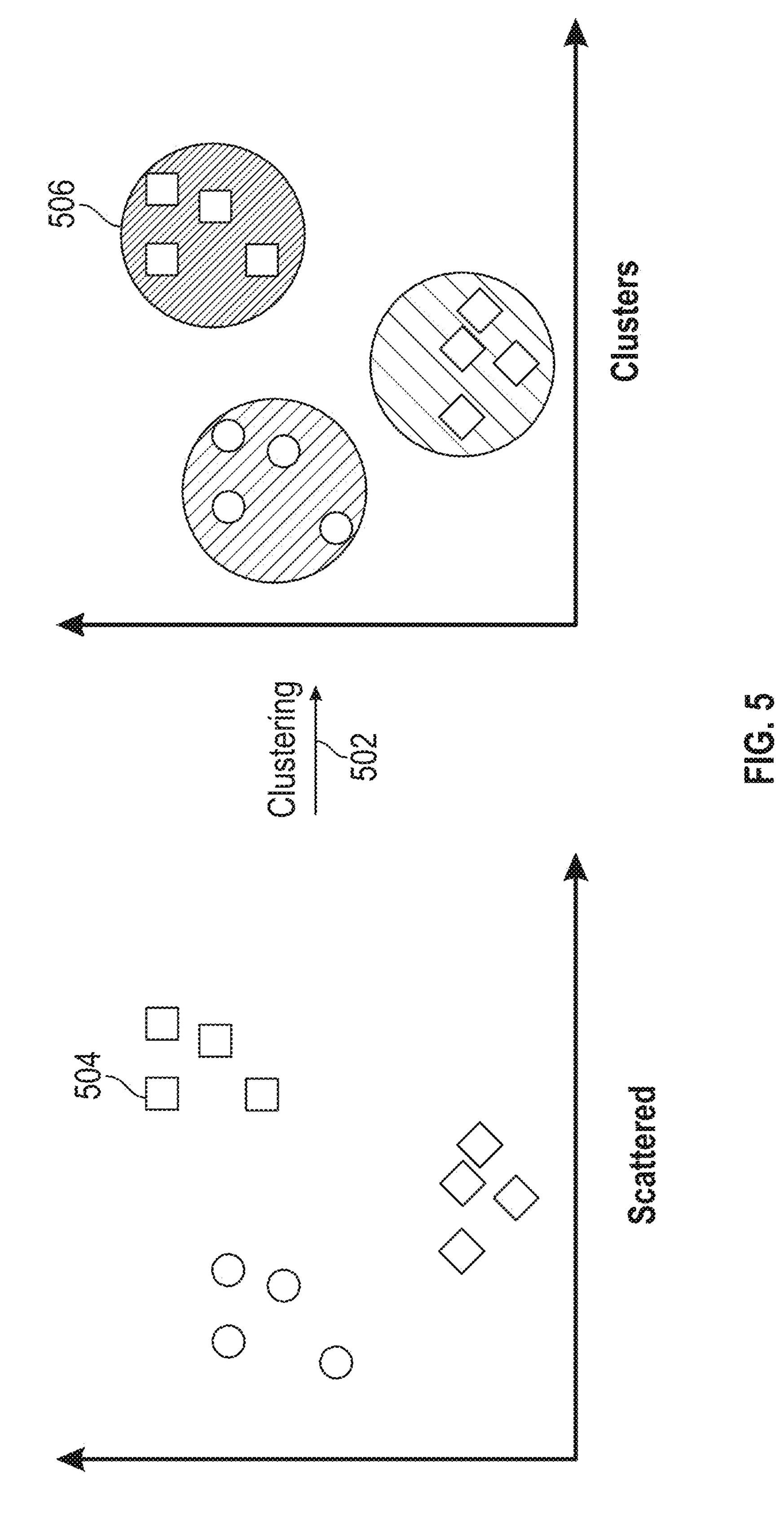
FIG. 5 is a diagram of a clustering plot, according to some embodiments of the subject disclosure.

FIG. 5 is a diagram of a clustering plot 500, according to some embodiments of the subject disclosure.

Clustering plot 500 displays a clustering process 502 for classifying selected rule 504. In some embodiments, selected rule 504 is a rule selected as described in operation 410 of approval rule discovery system 400. Clustering process 500 classifies, in a first cluster 506 selected rule 504 in response to a determination that the selected rule is accepted as a potential new rule or potential recommended rule. In some embodiments, clustering processes are carried out by K-means clustering. In some embodiments, clustering processes are carried out by mean shift clustering. In some embodiments, clustering processes are carried out by agglomerative clustering. In some embodiments, clustering processes are carried out by another clustering technique.

Figures 6, 7:
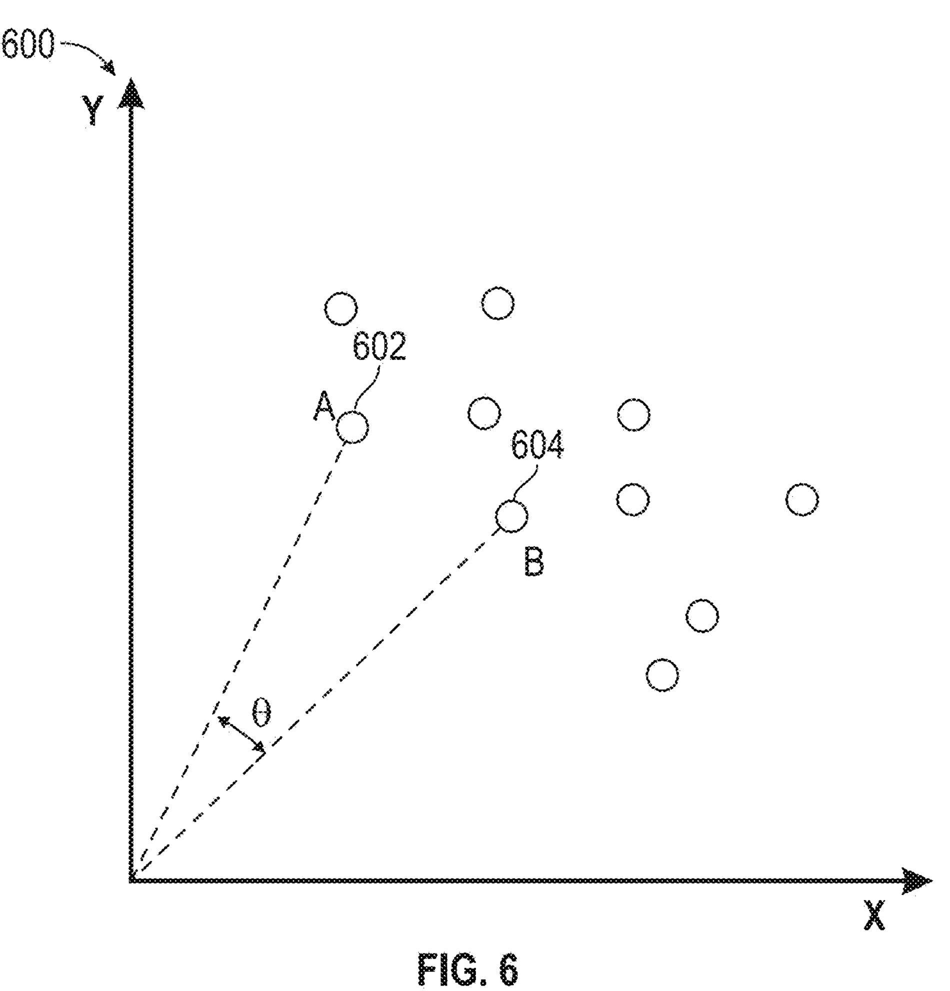
FIG. 6 is a diagram of a similarity determination plot, according to some embodiments of the subject disclosure.
FIG. 7 is a table of similarity measurements, according to at embodiments of the subject disclosure.

FIG. 6 is a diagram of a similarity determination plot 600, according to some embodiments of the subject disclosure.

Similarity determination plot 600 displays a similarity determination method for determining a similarity between a selected rule 602 and an existing rule 604, wherein the x-axis and y-axis represent a first rule attribute or property and a second rule attribute or property, respectively. In some embodiments, selected rule 602 is a rule selected as described in operation 410 of approval rule discovery system 400.

Parameters corresponding to attributes of rules are determined and transformed into one or more metrics by a transformation process. The transformation process is applied to selected rule 602 and existing rule 604. The transformation process produces corresponding transformed data for each rule that is compared. For example, in some embodiments, corresponding transformed data for each rule is compared on plot 600 by computing a distance parameter between points corresponding to the plotted corresponding transformed data for each rule. In some embodiments, rules including one or more attributes are compared by plotting corresponding transformed data in one or more dimensions. In some embodiments, two-attribute rules are compared by plotting corresponding transformed data in two dimensions. In some embodiments, three-attribute rules are compared by plotting corresponding transformed data in two dimensions. In some embodiments, multi-attribute rules are compared by plotting corresponding transformed data in multiple dimensions. In some embodiments, many-attribute rules are compared by plotting corresponding transformed data in many dimensions. In some embodiments, the data is compared using a cosine similarity determination based on an angle formed between points, as described herein. In some embodiments, the aforementioned angle reflects a relationship between the aforementioned points. In some embodiments, a similarity score is determined.

FIG. 7 is a table of similarity measurements 700, according to embodiments of the subject disclosure.

Similarity measurements 700 display a set of similarity scores, corresponding to cosine similarity scores measuring similarity of potential recommended rules and existing rules. In some embodiments, similarity measurements 700 are determined as described in similarity determination method described according to FIG. 6. A similarity threshold 702 that is pre-defined is compared with similarity measurements 700. In some embodiments, a similarity threshold is pre-defined is used to determine whether a potential recommended rule is recommended to a user. For example, a predefined threshold for similarity scores of potential recommended rules compared with existing rules is set by a user.

FIG. 8 is diagram of a graphical user interface (GUI) 800 for using an adjusted rule, according to some embodiments of the subject disclosure.

GUI 800 is associated with a user account. GUI 800 displays various fields or selectable options associated with approval rules. GUI 800 is used for entering or selecting user-defined key performance indicators (KPIs), according to some embodiments of the subject disclosure.

GUI 800 is associated with a user account. The GUI 800 displays various fields or selectable options associated with approval rules. For example, entry field 801 and various selectable dropdown menus 802-816 are displayed corresponding to various approval rule attributes, such as a rule name in entry field 801 or relevant key performance indicators (KPIs) in selectable dropdown menus 802-816. The KPIs 802-816 are associated with the user, user account, user role, etc. In 800, fields or selectable dropdowns are shown for a title 801, rules 802, activity type 803, workgroup 804, caretaker domain 805, vendor 806, ticket family 807, cause 808, type 809, priority 810, security type 811, change risk 812, tested lab 813, outage duration 814, vendor 815, and equipment type 816 are shown. In some embodiments, pre-selected attributes are displayed corresponding to a recommended rule. In some embodiments, pre-selected attributes for a recommended rule which differ from attributes of a corresponding auto-approval rule or existing rule are highlighted.

Figure 9:
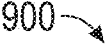
FIG. 9 is a block diagram of a computer architecture in accordance with some embodiments.
Figure 9:
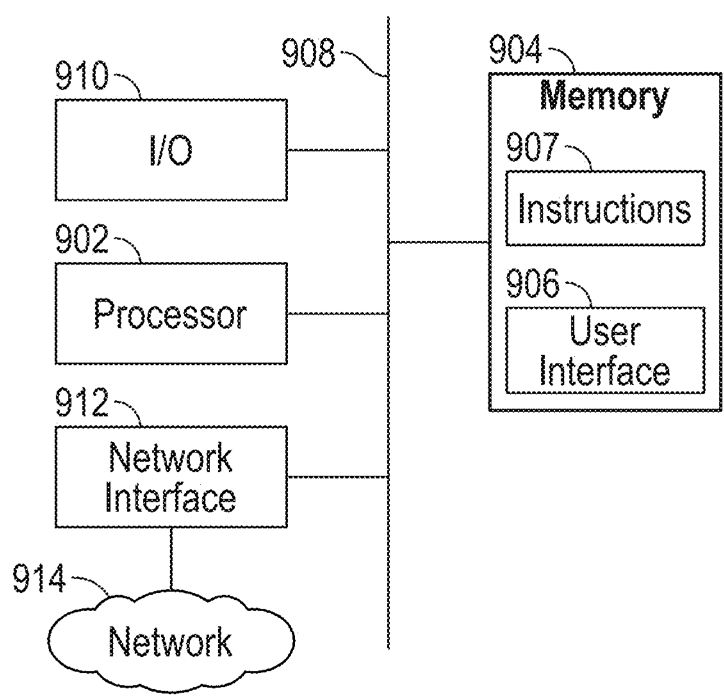

FIG. 9 is a block diagram of computer architecture 900 in accordance with some embodiments.

Computer architecture 900 includes a hardware processor 902 and a non-transitory, computer readable storage medium 904 encoded with, i.e., storing, the computer program code 906, i.e., a set of executable instructions. Computer readable storage medium 904 is also encoded with instructions 907 for interfacing with external devices. The processor 902 is electrically coupled to the computer readable storage medium 904 via a bus 908. The processor 902 is also electrically coupled to an I/O interface 910 by bus 908. A network interface 912 is also electrically connected to the processor 902 via bus 908. Network interface 912 is connected to a network 914, so that processor 902 and computer readable storage medium 904 are capable of connecting to external elements via network 914. The processor 902 is configured to execute the computer program code 906 encoded in the computer readable storage medium 904 in order to cause computer architecture 900 to be usable for performing a portion or all of the operations as described herein.

In some embodiments, the processor 902 is a central processing unit (CPU), a multi-processor, a distributed processing system, an application specific integrated circuit (ASIC), or a suitable processing unit.

In some embodiments, the computer readable storage medium 904 is an electronic, magnetic, optical, electromagnetic, infrared, or a semiconductor system (or apparatus or device). For example, the computer readable storage medium 904 includes a semiconductor or solid-state memory, a magnetic tape, a removable computer diskette, a random access memory (RAM), a read-only memory (ROM), a rigid magnetic disk, or an optical disk. In some embodiments using optical disks, the computer readable storage medium 904 includes a compact disk-read only memory (CD-ROM), a compact disk-read/write (CD-R/W), or a digital video disc (DVD).

In some embodiments, the storage medium 904 stores the computer program code 906 configured to cause computer architecture 900 to perform a portion or all of the operations as described herein. In some embodiments, the storage medium 904 also stores information needed for performing a portion or all of the operations as described herein as well as information generated during performing a portion or all of the operations as described herein, such as a user interface parameter 916.

In some embodiments, the storage medium 904 stores instructions 907 for interfacing with external devices. The instructions 907 enable processor 902 to generate instructions readable by the external devices to effectively implement a portion or all of the operations as described herein.

Computer architecture 900 includes I/O interface 910. I/O interface 910 is coupled to external circuitry. In some embodiments, I/O interface 910 includes a keyboard, keypad, mouse, trackball, trackpad, or cursor direction keys for communicating information and commands to processor 902.

Computer architecture 900 also includes network interface 912 coupled to the processor 902. Network interface 912 allows computer architecture 900 to communicate with network 914, to which one or more other computer systems are connected. Network interface 912 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described herein, and information are exchanged between different computer architecture 900 via network 914.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1)

steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, or processors supplied with computer-readable instructions stored on computer-readable media. In at least some embodiments, dedicated circuitry includes digital or analog hardware circuits and include integrated circuits (IC) or discrete circuits. In at least some embodiments, programmable circuitry includes reconfigurable hardware circuits including logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network or a wireless network. In at least some embodiments, the network includes copper transmission cables, optical transmission fibers, wireless transmission, routers, firewalls, switches, gateway computers or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the subject disclosure.

While embodiments of the subject disclosure have been described, the technical scope of any subject matter claimed is not limited to the above described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

Supplemental Note 1

A system includes a non-transitory computer readable medium configured to store instructions thereon. The system further includes a processor connected to the non-transitory computer readable medium, wherein the processor is configured to execute the instructions for instructing a display to display a first rule definition graphical user interface (GUI) displaying first attributes associated with a first rule. The processor is configured to execute the instructions for receiving a first multi-source dataset, wherein the first multi-source dataset comprises the first set of attributes associated with the first rule and a first set of requests comprising a first set of characteristics. The processor is configured to execute the instructions for training a machine learning tool using the first multi-source dataset, wherein the first set of attributes associated with the rule is used as input features for the machine learning model. The processor is configured to execute the instructions for dividing the first multi-source dataset into a set of clusters using a first unsupervised clustering technique, wherein the set of clusters comprises: a first cluster; and a second cluster. The processor is configured to execute the instructions for determining second attributes associated with a second rule based on the set of clusters. The processor is configured to execute the instructions for determining a similarity of the first attributes of the first rule and the second attributes of the second rule. The processor is configured to execute the instructions for delivering, in response to the similarity exceeding a first threshold, a first recommendation, wherein the delivering the first recommendation comprises instructing the display to display a second rule definition graphical user interface (GUI) displaying the second attributes associated with the second rule. The processor is configured to execute the instructions for receiving an indication to approve or commit the second rule.

Supplemental Note 2

In some embodiments, the processor of Supplemental Note 1 is further configured to execute the instructions for: updating the first multi-source dataset to include the second set of attributes associated with the second rule, or storing user feedback and using the user feedback or domain specific KPIs to further train the machine learning tool.

Supplemental Note 3

In some embodiments, the processor of any of Supplemental Notes 1-2 is further configured to execute the instructions for: delivering the first recommendation by providing a universal resource link (URL) to the second rule definition GUI displaying the second attributes associated with the second rule.

Supplemental Note 4

In some embodiments, the processor of any of Supplemental Notes 1-3 is further configured to execute the instructions for: instructing the display to display a form comprising dropdown form fields wherein options for each of the dropdown form fields are pre-selected to reflect the second attributes of the second rule.

Supplemental Note 5

In some embodiments, the system of any of Supplemental Notes 1-3: wherein a first subset of the options that contain differences between the first attributes of the first rule and the second attributes of the second rule are highlighted.

Supplemental Note 5

In some embodiments, the processor of any of Supplemental Notes 1-4 is further configured to execute the instructions for: determining a cosine similarity.

Supplemental Note 7

In some embodiments, the system of any of Supplemental Notes 1-6: wherein first multi-source dataset comprises data derived from process ticket requests or rule-approver preferences for approving rules.

Supplemental Note 8

A method includes instructing a display to display a first rule definition graphical user interface (GUI) displaying first attributes associated with a first rule. The method further includes receiving a first multi-source dataset, wherein the first multi-source dataset comprises the first set of attributes associated with the first rule. The method further includes a first set of requests comprising a first set of characteristics. The method further includes training a machine learning tool using the first multi-source dataset, wherein the first set of attributes associated with the rule is used as input features for the machine learning model. The method further includes dividing the first multi-source dataset into a set of clusters using a first unsupervised clustering technique, wherein the set of clusters comprises a first cluster and a second cluster. The method further includes determining second attributes associated with a second rule based on the set of clusters. The method further includes determining a similarity of the first attributes of the first rule and the second attributes of the second rule. The method further includes delivering, in response to the similarity exceeding a first threshold, a first recommendation, wherein the delivering the first recommendation comprises instructing the display to display a second rule definition graphical user interface (GUI) displaying the second attributes associated with the second rule. The method further includes receiving an indication to approve or commit the second rule.

Supplemental Note 9

The method of Supplemental Note 8 further comprising: updating the first multi-source dataset to include the second set of attributes associated with the second rule, or storing user feedback and using the user feedback or domain specific KPIs to further train the machine learning tool.

Supplemental Note 10

The method of any of Supplemental Notes 8-9 further comprising: delivering the first recommendation by providing a universal resource link (URL) to the second rule definition GUI displaying the second attributes associated with the second rule.

Supplemental Note 11

The method of any of Supplemental Notes 8-10 further comprising: instructing the display to display a form comprising dropdown form fields wherein options for each of the dropdown form fields are pre-selected to reflect the second attributes of the second rule.

Supplemental Note 12

The method of any of Supplemental Notes 8-11: wherein a first subset of the options that contain differences between the first attributes of the first rule and the second attributes of the second rule are highlighted.

Supplemental Note 13

The method of any of Supplemental Notes 8-12 further comprising: determining a cosine similarity.

Supplemental Note 14

The method of any of Supplemental Notes 8-13: wherein first multi-source dataset comprises data derived from process ticket requests or rule-approver preferences for approving rules.

Supplemental Note 15

A non-transitory computer readable medium configured to store instructions thereon. The instructions are configured to cause a processor to perform operations comprising instructing a display to display a first rule definition graphical user interface (GUI) displaying first attributes associated with a first rule. The instructions are configured to cause a processor to perform operations comprising receiving a first multi-source dataset, wherein the first multi-source dataset comprises the first set of attributes associated with the first rule and a first set of requests comprising a first set of characteristics. The instructions are configured to cause a processor to perform operations comprising training a machine learning tool using the first multi-source dataset, wherein the first set of attributes associated with the rule is used as input features for the machine learning model. The instructions are configured to cause a processor to perform operations comprising dividing the first multi-source dataset into a set of clusters using a first unsupervised clustering technique, wherein the set of clusters comprises a first cluster a second cluster. The instructions are configured to cause a processor to perform operations comprising determining second attributes associated with a second rule based on the set of clusters. The instructions are configured to cause a processor to perform operations comprising determining a similarity of the first attributes of the first rule and the second attributes of the second rule. The instructions are configured to cause a processor to perform operations comprising delivering, in response to the similarity exceeding a first threshold, a first recommendation, wherein the delivering the first recommendation comprises instructing the display to display a second rule definition graphical user interface (GUI) displaying the second attributes associated with the second rule. The instructions are configured to cause a processor to perform operations comprising receiving an indication to approve or commit the second rule.

Supplemental Note 16

The non-transitory computer readable medium of Supplemental Note 15, wherein the instructions are configured to cause a processor to perform operations comprising: updating the first multi-source dataset to include the second set of attributes associated with the second rule, or storing user feedback and using the user feedback or domain specific KPIs to further train the machine learning tool.

Supplemental Note 17

The non-transitory computer readable medium of any of Supplemental Notes 15-16, wherein the instructions are configured to cause a processor to perform operations comprising: delivering the first recommendation by providing a universal resource link (URL) to the second rule definition GUI displaying the second attributes associated with the second rule.

Supplemental Note 18

The non-transitory computer readable medium of any of Supplemental Notes 15-17, wherein the instructions are configured to cause a processor to perform operations comprising: instructing the display to display a form comprising dropdown form fields wherein options for each of the dropdown form fields are pre-selected to reflect the second attributes of the second rule.

Supplemental Note 19

The non-transitory computer readable medium of any of Supplemental Notes 15-18: wherein a first subset of the options that contain differences between the first attributes of the first rule and the second attributes of the second rule are highlighted.

Supplemental Note 20

The non-transitory computer readable medium of any of Supplemental Notes 15-19, wherein the instructions are configured to cause a processor to perform operations comprising: determining a cosine similarity.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system comprising:
- a non-transitory computer readable medium configured to store instructions thereon; and
- a processor connected to the non-transitory computer readable medium, wherein the processor is configured to execute the instructions for:
  - instructing a display to display a first rule definition graphical user interface (GUI) displaying first attributes associated with a first rule;
  - receiving a first multi-source dataset, wherein the first multi-source dataset comprises:
    - the first set of attributes associated with the first rule;
    - a first set of requests comprising a first set of characteristics;
  - training a machine learning tool using the first multi-source dataset;
    - wherein the first set of attributes associated with the rule is used as input features for the machine learning model;
  - dividing the first multi-source dataset into a set of clusters using a first unsupervised clustering technique, wherein the set of clusters comprises:
    - a first cluster;
    - a second cluster;
  - determining second attributes associated with a second rule based on the set of clusters;
  - determining a similarity of the first attributes of the first rule and the second attributes of the second rule;
  - delivering, in response to the similarity exceeding a first threshold, a first recommendation, wherein the delivering the first recommendation comprises:
  - instructing the display to display a second rule definition graphical user interface (GUI) displaying the second attributes associated with the second rule; and
  - receiving an indication to approve or commit the second rule.

2. The system of claim 1, wherein the processor is further configured to execute the instructions for:
- updating the first multi-source dataset to include the second set of attributes associated with the second rule; or storing user feedback and using the user feedback or domain specific KPIs to further train the machine learning tool.

3. The system of claim 1 wherein the processor is further configured to execute the instructions for:

delivering the first recommendation by providing a universal resource link (URL) to the second rule definition GUI displaying the second attributes associated with the second rule.

4. The system of claim 3, wherein the processor is further configured to execute the instructions for:

instructing the display to display a form comprising dropdown form fields wherein options for each of the dropdown form fields are pre-selected to reflect the second attributes of the second rule.

5. The system of claim 4, wherein a first subset of the options that contain differences between the first attributes of the first rule and the second attributes of the second rule are highlighted.

6. The system of claim 1, wherein the processor is further configured to execute the instructions for:

determining a cosine similarity.

7. The system of claim 1, wherein first multi-source dataset comprises:

data derived from process ticket requests or rule-approver preferences for approving rules.

8. A method comprising:

instructing a display to display a first rule definition graphical user interface (GUI) displaying first attributes associated with a first rule;

receiving a first multi-source dataset, wherein the first multi-source dataset comprises:

the first set of attributes associated with the first rule;

a first set of requests comprising a first set of characteristics;

training a machine learning tool using the first multi-source dataset;

wherein the first set of attributes associated with the rule is used as input features for the machine learning model;

dividing the first multi-source dataset into a set of clusters using a first unsupervised clustering technique, wherein the set of clusters comprises:

a first cluster;

a second cluster;

determining second attributes associated with a second rule based on the set of clusters;

determining a similarity of the first attributes of the first rule and the second attributes of the second rule;

delivering, in response to the similarity exceeding a first threshold, a first recommendation, wherein the delivering the first recommendation comprises:

instructing the display to display a second rule definition graphical user interface (GUI) displaying the second attributes associated with the second rule; and receiving an indication to approve or commit the second rule.

9. The method of claim 8, further comprising:

updating the first multi-source dataset to include the second set of attributes associated with the second rule; or storing user feedback and using the user feedback or domain specific KPIs to further train the machine learning tool.

10. The method of claim 8, further comprising:

delivering the first recommendation by providing a universal resource link (URL) to the second rule definition GUI displaying the second attributes associated with the second rule.

11. The method of claim 10, further comprising:

instructing the display to display a form comprising dropdown form fields wherein options for each of the dropdown form fields are pre-selected to reflect the second attributes of the second rule.

12. The method of claim 11, wherein a first subset of the options that contain differences between the first attributes of the first rule and the second attributes of the second rule are highlighted.

13. The method of claim 8, further comprising:

determining a cosine similarity.

14. The method of claim 8, wherein first multi-source dataset comprises:

data derived from process ticket requests or rule-approver preferences for approving rules.

15. A non-transitory computer readable medium configured to store instructions that when executed cause a processor to perform operations comprising:

instructing a display to display a first rule definition graphical user interface (GUI) displaying first attributes associated with a first rule;

receiving a first multi-source dataset, wherein the first multi-source dataset comprises:

the first set of attributes associated with the first rule;

a first set of requests comprising a first set of characteristics;

training a machine learning tool using the first multi-source dataset;

wherein the first set of attributes associated with the rule is used as input features for the machine learning model;

dividing the first multi-source dataset into a set of clusters using a first unsupervised clustering technique, wherein the set of clusters comprises:

a first cluster;

a second cluster;

determining second attributes associated with a second rule based on the set of clusters;

determining a similarity of the first attributes of the first rule and the second attributes of the second rule;

delivering, in response to the similarity exceeding a first threshold, a first recommendation, wherein the delivering the first recommendation comprises:

instructing the display to display a second rule definition graphical user interface (GUI) displaying the second attributes associated with the second rule; and receiving an indication to approve or commit the second rule.

16. The non-transitory computer readable medium of claim 15, wherein the instructions are configured to cause the processor to perform operations further comprising:

updating the first multi-source dataset to include the second set of attributes associated with the second rule; or storing user feedback and using the user feedback or domain specific KPIs to further train the machine learning tool.

17. The non-transitory computer readable medium of claim 15, wherein the instructions are configured to cause the processor to perform operations further comprising:

delivering the first recommendation by providing a universal resource link (URL) to the second rule definition GUI displaying the second attributes associated with the second rule.

18. The non-transitory computer readable medium of claim 17, wherein the instructions are configured to cause the processor to perform operations further comprising:

instructing the display to display a form comprising dropdown form fields wherein options for each of the dropdown form fields are pre-selected to reflect the second attributes of the second rule.

19. The non-transitory computer readable medium of claim 18, wherein a first subset of the options that contain differences between the first attributes of the first rule and the second attributes of the second rule are highlighted.

20. The non-transitory computer readable medium of claim 15, to perform operations further comprising:

determining a cosine similarity.

* * * * *